(12) United States Patent
C V

(10) Patent No.: US 12,149,562 B1
(45) Date of Patent: Nov. 19, 2024

(54) APPARATUSES, METHODS, AND COMPUTER PROGRAM PRODUCTS FOR MULTI-CHANNEL INTERACTIONS

(71) Applicant: Wells Fargo Bank, N.A., San Francisco, CA (US)

(72) Inventor: Badrinath C V, Bangalore (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 307 days.

(21) Appl. No.: 17/680,804

(22) Filed: Feb. 25, 2022

(51) Int. Cl.
 *H04L 9/40* (2022.01)

(52) U.S. Cl.
 CPC .............. *H04L 63/18* (2013.01); *H04L 63/04* (2013.01); *H04L 63/08* (2013.01)

(58) Field of Classification Search
 None
 See application file for complete search history.

(56) References Cited

U.S. PATENT DOCUMENTS

| 7,278,028 | B1 | 10/2007 | Hingoranee |
| 9,386,152 | B2 | 7/2016 | Riahi et al. |
| 2005/0101302 | A1* | 5/2005 | Vogedes ................ H04W 4/14 455/412.2 |
| 2011/0211679 | A1* | 9/2011 | Mezhibovsky ......... H04W 4/12 379/201.03 |
| 2012/0254947 | A1* | 10/2012 | Dheap ................ H04L 63/1416 726/4 |
| 2014/0270108 | A1* | 9/2014 | Riahi ....................... H04M 5/00 379/88.01 |
| 2019/0347668 | A1 | 11/2019 | Williams et al. |

* cited by examiner

*Primary Examiner* — Scott B Christensen
(74) *Attorney, Agent, or Firm* — K&L Gates LLP

(57) ABSTRACT

A method, apparatus, and computer program product for multi-channel interactions are provided. An example method includes receiving a request for an authenticated session associated with a first user and establishing the authenticated session with the first user. Establishing the authenticated session includes establishing a first communication channel with the first user and establishing a second communication channel with the first user. The method further includes generating a candidate response data object based upon one or more user inputs received via the first and/or second communication channel. In response, the method includes determining a first response format for conveying one or more data entries defined by the candidate response data object to the first user via the first communication channel and determining a second response format for conveying the one or more data entries defined by the candidate response data object to the first user via the second communication channel.

20 Claims, 6 Drawing Sheets

APPARATUSES, METHODS, AND COMPUTER PROGRAM PRODUCTS FOR MULTI-CHANNEL INTERACTIONS

TECHNOLOGICAL FIELD

Example embodiments of the present disclosure relate generally to device communication and, more particularly, to data formatting and transmission amongst distinct communication channels.

BACKGROUND

Users often communicate with a variety of businesses, merchants, financial institutions, and other entities as part of their day-to-day lives. By way of example, a customer may contact a business to request assistance with an account associated with that entity via one or more user devices of the customer. As technology progresses, the way in which entities interact with users and/or the way in which information is presented to users may influence an entity's ability to successfully connect with users.

BRIEF SUMMARY

As described above, users may communicate or otherwise interact with a variety of businesses, merchants, financial institutions, and other entities as part of their day-to-day lives. In order to address requests by these users, such as by a request for an interaction, session, etc. received from a user's device, these entities may utilize teams of operators. By way of example, a user may contact an entity to request assistance with one or more accounts of the user with the entity and may be assisted (e.g., via telephone, web application, chat, etc.) by an operator of the entity. The success of these interactions is often impacted by the success of the operator in providing the necessary information to the user to address the user's request. As such, the success of interactions with the same entity may vary widely amongst users based upon the operator assigned to assist in a particular user's request.

Traditional attempts at improving user interactions often rely upon generic responses (e.g., without any specificity to the particular user) so as to provide a uniform response strategy for each interaction with an entity regardless of assigned operator. These conventional systems, however, often fail to provide tailored information to users resulting in poor user interaction (e.g., a user failing to receive the requested information in the appropriate format for the particular user). Furthermore, the progression of technology has provided new mechanisms for users to communicate with these entities, such as via a simultaneous telephone call to an operator, an interaction with a web-based or equivalent application, or the like. The generic or uniform responses provided by these traditional systems fail to further account for the ability to convey information in different formats to users based upon the nature of the communication channel by which the information is conveyed. In other words, a user may receive the same information in the same format via a telephone call with an operator that is provided via a web-based application (e.g., displayed via a user device). Such redundancy may operate to further reduce the user's satisfaction with the interaction. Given that particular operators, due to experience or otherwise, may have an increased rate of success with user interactions relative to other operators, some traditional systems also attempt to divert particular users, particular requests, etc. to these operators. Due to the limited availability of these operators, these systems often fail to timely respond to user requests, such as instances in which a particular operator is backlogged with requests.

To solve these issues and others, example implementations of embodiments of the present disclosure may generate candidate response data objects that account for the nuances associated with a particular user, as gathered from prior interactions with the particular user, and further leverage the successful response strategies employed by successful operators, as gathered from prior interactions by these successful operators. In operation, the embodiments described herein may access user interaction databases that include data entries associated with successful interactions with a particular user as well as operator success databases that include data entries associated with successful responses by operators associated with particular user requests, issues, etc. Furthermore, the embodiments described herein may selectively format data entries based upon the particular channels by which the data may be provided to the user. For example, the format of data that is convey to a user via a communication channel that may be viewed (e.g., a display of a user device) may provide additional detail that may be difficult to provide via a communication channel that is heard (e.g., a telephone communication with an operator). In this way, the inventors have identified that the advent of computing resources have created a new opportunity for solutions for device interaction and multi-channel communication which were historically unavailable.

Systems, apparatuses, methods, and computer program products are disclosed herein for multi-channel interactions. In one embodiment, with reference to the claimed computer-implemented method, a method for multi-channel interactions is provided. The method may include receiving, by a computing device, a request for an authenticated session associated with a first user and establishing the authenticated session with the first user. Establishing the authenticated session may include establishing a first communication channel with the first user and establishing a second communication channel with the first user. The method may further include generating a candidate response data object based upon one or more user inputs received by the computing device via the first communication channel and/or the second communication channel. The method may also include determining a first response format for conveying one or more data entries defined by the candidate data response object to the first user via the first communication channel and determining a second response format for conveying the one or more data entries defined by the candidate data response object to the first user via the second communication channel.

In some embodiments, the method may further include generating an operator notification that includes the first response format and the second response format for displaying to an operator associated with the computing device.

In some embodiments, the first communication channel and the second communication channel may each be established with a first user device of the first user.

In some further embodiments, the method may include generating a transmission to the first user device that conveys the one or more data entries to the first user in the first response format via the first communication channel of the first user device and that conveys the one or more data entries to the first user in the second response format via the second communication channel of the first user device.

In other embodiments, the first communication channel may be established with a first user device of the first use, and the second communication channel may be established with a second user device of the first user.

In some further embodiments, the method may include generating a transmission to the first user device that conveys the one or more data entries to the first user in the first response format via the first communication channel and generating a transmission to the second user device that conveys the one or more data entries to the first user in the second response format via the second communication channel.

In some embodiments, generating the candidate response data object further includes querying a user interaction database and acquiring user interaction data of the first user indicative of one or more prior interactions between the first user and the computing device. In such an embodiment, the method may further include generating the candidate response data object based upon the user interaction data of the first user.

In other embodiments, generating the candidate response data object may further include identifying one or more parameters associated with the user inputs received by the computing device, querying an operator success database, and acquiring operator success data indicative of one or more prior successful interactions associated with the one or more parameters completed by the computing device. In such an embodiment, the method may include generating the candidate response data object based upon the operator success data.

In any embodiment, the method may include continuously authenticating the first user via one or more inputs iteratively received by the computing device via the first communication channel and/or the second communication channel.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1:
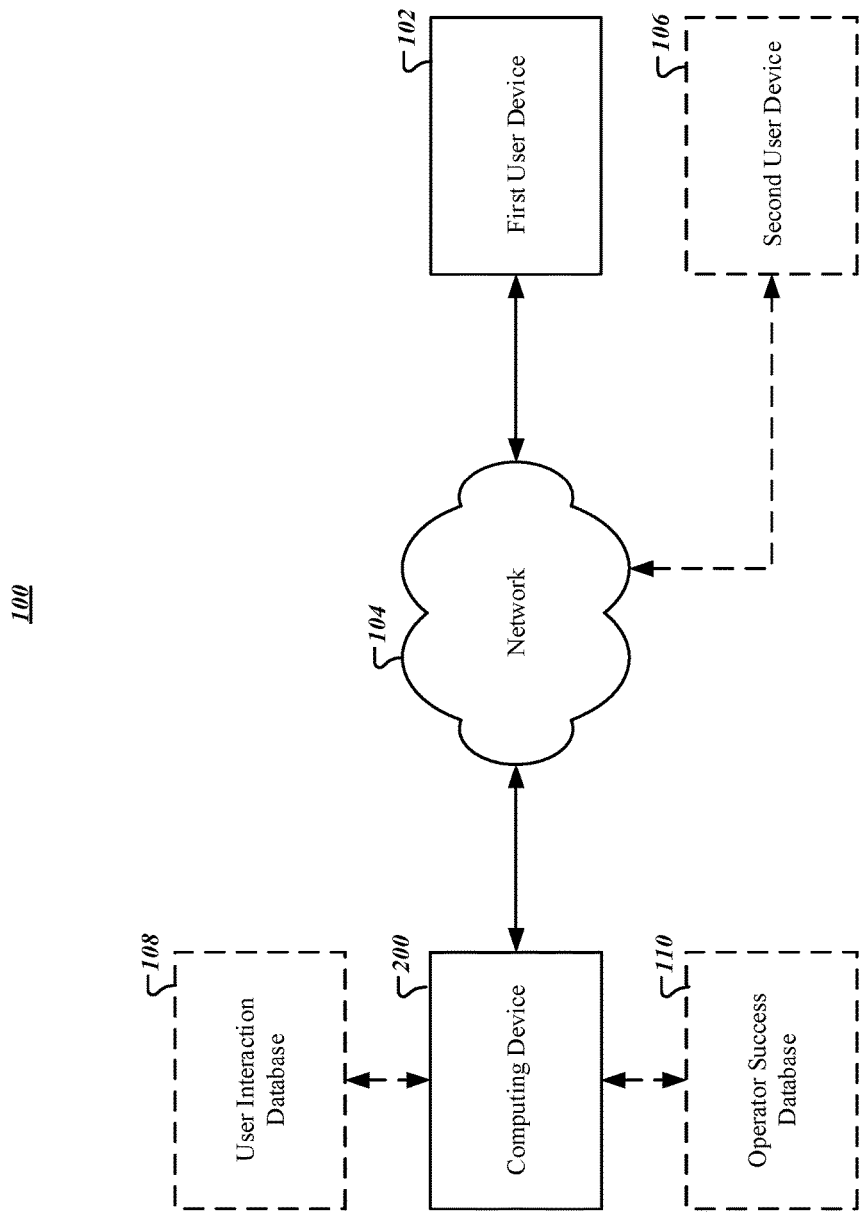
FIG. 1 illustrates a system diagram including devices that may be involved in some example embodiments described herein.

Some embodiments of the present disclosure will now be described more fully hereinafter with reference to the accompanying drawings, in which some, but not all embodiments of the disclosure are shown. Indeed, these embodiments may be embodied in many different forms and should not be construed as limited to the embodiments set forth herein; rather, these embodiments are provided so that this disclosure will satisfy applicable legal requirements. Like numbers refer to like elements throughout. As used herein, the description may refer to a computing device as an example "apparatus." However, elements of the apparatus described herein may be equally applicable to the claimed method and computer program product. Thus, use of any such terms should not be taken to limit the spirit and scope of embodiments of the present disclosure.

Definition of Terms

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used herein to mean "serving as an example, instance, or illustration." Any implementation described herein as "example" is not necessarily to be construed as preferred or advantageous over other implementations.

As used herein, the term "computing device" refers to computer hardware that is configured (either physically or by the execution of software) to generate, manage, and/or determined candidate response data objects and subsequently determine associated response formats and, among various other functions, is configured to directly, or indirectly, transmit and receive data. An example computing device may include a smartphone, a tablet computer, a laptop computer, a central server, a remote server, a wearable device (e.g., smart glasses, smart watch, or the like), and the like. In some embodiments, a computing device may include a "smart device" that is equipped with a chip or other electronic device that is configured to communicate with a first user device, a second user device, and/or a third user device via Bluetooth, NFC, Wi-Fi, 3G, 4G, 5G, RFID protocols, and the like. By way of a particular example, a computing device of the present disclosure may be a centralized server of an example financial institution with which user devices may interact.

As used herein, the terms "first user device," "first mobile device," "first electronic device," and the like refer to computer hardware that is configured (either physically or by the execution of software) to access one or more services made available by the computing device (e.g., apparatus of the present disclosure) and, among various other functions, is configured to directly, or indirectly, transmit and receive data. Example first user devices may include a smartphone, a tablet computer, a laptop computer, a wearable device (e.g., smart glasses, smart watch, or the like), and the like. In some embodiments, a first user device may include a "smart device" that is equipped with a chip or other electronic device that is configured to communicate with the computing device via Bluetooth, NFC, Wi-Fi, 3G, 4G, 5G, RFID protocols, and the like. By way of a particular example, a first user device may be a mobile phone equipped with a Wi-Fi radio associated with a first user that is configured to communicate with a Wi-Fi access point that is in communication with the computing device 200 or other computing device via a network. In some embodiments, as described hereafter, the first user device may be configured to support, access, leverage, provide, or otherwise use a plurality of distinct communication channels (e.g., a first communication channel, a second communication channel, etc.). By way of example, the first user device may establish a second communication channel with the computing device described herein via accessing a web application hosted by the computing device (e.g., viewed by a display of the first). Additionally or alternatively, the first user device may establish a first communication channel with the computing device described herein via calling an operator associated with the computing device (e.g., talking with the operator over a phone line or otherwise).

The first user device may be associated with a first user that defines, includes, or is otherwise associated with one or more user characteristics of the first user. By way of example, the one or more user characteristics of the first user may include one or more data entries required for the first user to interact with the computing device (e.g., a central server of a financial institution or otherwise). As such, the user characteristics may include data entries associated with or indicative of the first user's name, identification number, account number, address, credit score, account balance, employment history, image, video, and/or any other feature, element, or item associated with the first user. By way of a nonlimiting example, the one or more first user characteristics may include location data entries indicative of locations at which the first user is commonly located (e.g., a work address, current home address, family member's address, gym address, etc.), investment data entries indicative of the first user's savings, investments, etc., social media data indicative of the first user's preferences, opinions, etc., and/or the like. As described hereafter, an operator associated with the computing device (e.g., the apparatus of the present disclosure) may access one or more user characteristics of the first user as part of an interaction with the first user (i.e., so as to provide tailed responses to the user's request(s)).

As used herein, the terms "second user device," "second mobile device," "second electronic device," and the like refer to computer hardware that is configured (either physically or by the execution of software) to access one or more services made available by the computing device (e.g., apparatus of the present disclosure) and, among various other functions, is configured to directly, or indirectly, transmit and receive data. Example second user devices may include a smartphone, a tablet computer, a laptop computer, a wearable device (e.g., smart glasses, smart watch, or the like), and the like. In some embodiments, a second user device may include a "smart device" that is equipped with a chip or other electronic device that is configured to communicate with the computing device via Bluetooth, NFC, Wi-Fi, 3G, 4G, 5G, RFID protocols, and the like. By way of a particular example, a second user device may be a mobile phone equipped with a Wi-Fi radio associated with the first user that is configured to communicate with a Wi-Fi access point that is in communication with the computing device 200 or other computing device via a network. In other words, the second user device of the first user may include any user device associated with the first user other than the first user device as define above.

As used herein, the terms "user interaction database" refer to a data structure or repository for storing data entries associated with or indicative of one or more prior interactions between the first user and the computing device. As described hereafter, the computing device of the present disclosure may be associated with an entity (e.g., a financial institution or otherwise) with which the first user interacts (e.g., due to an account of the first user with the entity or the like). As such, the first user may interact with the computing device at various times, such as requesting the assistance of an operator associated with the computing device (e.g., an employee of the financial instruction or otherwise) with regard to an example account of the first user. During each interaction, the operator (e.g., the same or distinct operators for each interaction) may provide information, responses, etc. to the first user in an attempt to satisfy the first user's request. The information provided to the first user, the outcome of the interaction, the wording/tone of the operator used by the operator, and/or any metric associated with the interaction may be stored by the user interaction database for further improving subsequent interactions with the first user. In some embodiments, the user interaction database may leverage machine learning, artificial intelligence, reinforcement learning, neural networks, etc. in order to predict or otherwise ascertain the response of the first user when presented with particular data in a particular format having a particular wording, tone, or other such configuration.

As used herein, the terms "operator success database" refer to a data structure or repository for storing data entries associated with or indicative of one or more prior interactions between a plurality of users and the computing device. As described above and hereafter, the computing device of the present disclosure may be associated with an entity (e.g., a financial institution or otherwise) with which a plurality of users interact (e.g., due to respective accounts of the users with the entity or the like). As such, these users may interact with the computing device at various times, such as requesting the assistance of an operator associated with the computing device (e.g., an employee of the financial instruction or otherwise) with regard to an example account of the user(s). During each interaction, the operator (e.g., the same or distinct operators for each interaction) may similarly provide information, responses, etc. to the respective user in an attempt to satisfy the user's request. Each interaction (e.g., a request by a user) with the computing device may further be associated with one or more parameters that define the characteristics, type, etc. of the request. By way of example, the one or more parameters may be indicative of the amount defined by a transaction, the time period during which the associated user has had an account with the entity, the nature of the request (e.g., user account access, financial transaction success, employee complaints, etc.), and/or the like. As such, the operator success database may group interactions, the data provided during these grouped interactions, the success of each interaction within each group, etc. for further improvement subsequent interactions with the computing device/operator associated with similar parameters. In some embodiments, the operator success database may also leverage machine learning, artificial intelligence, reinforcement learning, neural networks, etc. in order to predict or otherwise ascertain the response of the first user when presented with particular data in a particular format having a particular wording/tone based upon prior similarly grouped requests/interactions by other users.

The terms "candidate response data object," "response data object," and/or the like refer to electronically-managed data that is generated by the computing device (e.g., apparatus, computing device, or central server of the present disclosure) and comprises or is otherwise indicative of data entries responsive to a request by the first user. For example, the candidate response data object may include data entries that define the wording, tone, or any other formatting selection/configuration of the data, information, etc. requested by the first user during the interaction (e.g., during the authenticated session described hereafter). By way of example, the first user may request assistance in accessing an account of the first user with a financial institution associated with the computing device. The operations described hereafter may generate a candidate response data object that provides information to the first user for accessing this account including the wording of the instructions to the first user, the tone in which the instructions are provided, the appearance (e.g., in the case of a visual display) of the instructions provided to the first user, etc. As would be evident in light of the present disclosure, the way in which information (e.g., one or more data entries) is provided to the user may vary. As such, in some embodiments, the candidate response data object may include data entries associated with various options for presenting (e.g., with associated success scores or the like) the information to the first user for review by an operator associated with the computing device. In some embodiments, as described hereafter, the candidate response data object may include distinct formats for conveying the information (e.g., data entries) to the first user based upon distinct communication channels, such as those defined above.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

Having set forth a series of definitions called-upon throughout this application, an example system architecture and example apparatus is described below for implementing example embodiments and features of the present disclosure.

Device Architecture and Example Apparatus

With reference to FIG. 1, an example system 100 is illustrated with an apparatus (e.g., a computing device 200) communicably connected via a network 104 to a first user device 102, and, in some embodiments, a second user device 106. Although illustrated with two user devices 102, 106, the present disclosure contemplates that the computing device 200 may be communicably connected with any number of user devices associated with the first user. The example system 100 may also include a user interaction database 108 that may be communicably coupled with the computing device 200, the first user device 102, and/or the second user device 106. The example system 100 may further, in some embodiments, include an operator success database 100 that may be communicably coupled with the computing device 200, the first user device 102, and/or the second user device 106.

The computing device 200 may include circuitry, networked processors, or the like configured to perform some or all of the apparatus-based (e.g., computing device-based) processes described herein, and may be any suitable network server and/or other type of processing device. In this regard, computing device 200 may be embodied by any of a variety of devices. For example, the computing device 200 may be configured to receive data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, automated teller machine (ATM), or in some embodiments, a peripheral device that connects to one or more fixed or mobile terminals. Example embodiments contemplated herein may have various form factors and designs but will nevertheless include at least the components illustrated in FIG. 2 and described in connection therewith. In some embodiments, the computing device 200 may be located remotely from the first user device 102, second user device 106, operator success database 110, and/or user interaction database 108. In other embodiments, the computing device 200 may comprise the first user device 102, second user device 106, operator success database 110, and/or user interaction database 108. The computing device 200 may, in some embodiments, comprise several servers or computing devices performing interconnected and/or distributed functions. Despite the many arrangements contemplated herein, the computing device 200 is shown and described herein as a single computing device to avoid unnecessarily overcomplicating the disclosure.

The network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network 104 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network 104 may include a public network, such as the Internet, a private network, such as an intranet, or combinations thereof, and may utilize a variety of networking protocols now available or later developed including, but not limited to TCP/IP based networking protocols.

The first user device 102 may be associated with a first user and may be configured to interact with the computing device 200. The first user device 102 may be a cellular telephone (including smartphones and/or other types of mobile telephones), laptop, tablet, electronic reader, e-book device, media device, wearable, smart glasses, smartwatch, VR device, AR device, or any combination of the above. The first user device 102 may be communicably coupled with the computing device 200 via the network 104 and configured to transmit data to and receive data from the computing device 200. By way of example, the first user device 102 may include a smartphone, mobile device, etc. configured to transmit a request for an authenticated session with the computing device, such as via a first and/or second communication channel. In other words, the first user device 102 may be configured to establish a plurality of communication channels (e.g., a first communication channel, a second communication channel, etc.) via the same first user device 102.

The second user device 106 may be also associated with the first user and may be configured to interact with the computing device 200. The second user device 106 may be a cellular telephone (including smartphones and/or other types of mobile telephones), mobile device, laptop, tablet, electronic reader, e-book device, media device, wearable, smart glasses, smartwatch, VR device, AR device, or any combination of the above. The second user device 106 may be communicably coupled with the computing device 200 via the network 104 and configured to transmit data to and receive data from the computing device 200. By way of example, the second user device 106 may include a tablet, laptop computer, etc. configured to transmit a request for an authenticated session with the computing device, such as via a second communication channel. In other words, the second user device 106 may be configured to a second communication channel distinct from a first communication channel established with the first user device 102. The present disclosure contemplates that any number of distinct or interconnected user devices and associated communication channels may be used by the embodiments described herein.

The user interaction database 108 may be stored by any suitable storage device, memory structure, data repository, etc. configured to store some or all of the information described herein (e.g., a separate memory system separate from the computing device 200, such as one or more database systems, backend data servers, network databases, cloud storage devices, or the like). The user interaction database 108 may comprise data received from the computing device 200 (e.g., via a memory 204 and/or processor(s) 202), the first user device 102 and/or the second user device 106 and the corresponding storage device may thus store this data. To avoid unnecessarily overcomplicating the disclosure, the user interaction database 108 is shown and described as a separate database, despite the fact that they may each be hosted by any number of specific physical devices, together or separately.

The operator success database 110 may be stored by any suitable storage device, memory structure, data repository, etc. configured to store some or all of the information described herein (e.g., a separate memory system separate from the computing device 200, such as one or more database systems, backend data servers, network databases, cloud storage devices, or the like). The operator success database 110 may comprise data received from the computing device 200 (e.g., via a memory 204 and/or processor(s) 202), the first user device 102 and/or the second user device 106 and the corresponding storage device may thus store this data. To avoid unnecessarily overcomplicating the disclosure, the operator success database 110 is shown and described as a separate database, despite the fact that they may each be hosted by any number of specific physical devices, together or separately.

Figure 2:
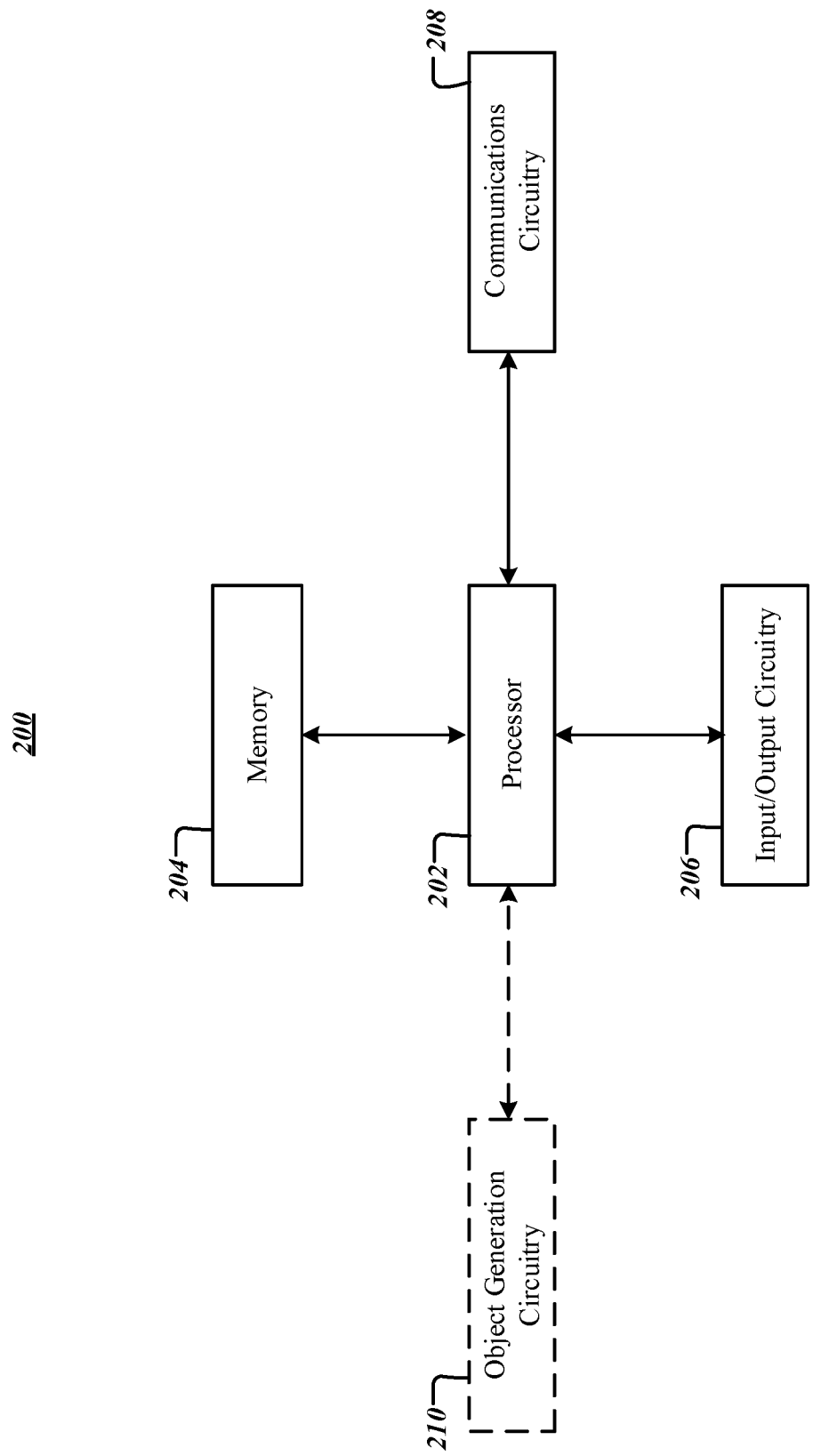
FIG. 2 illustrates a schematic block diagram of example circuitry that may perform various operations, in accordance with some example embodiments described herein.

As illustrated in FIG. 2, the computing device 200 may include a processor 202, a memory 204, input/output circuitry 206, and communications circuitry 208. Moreover, computing device 200 may include object generation circuitry 210. The computing device 200 may be configured to execute the operations described below in connection with FIGS. 3-6. Although components 202-210 are described in some cases using functional language, it should be understood that the particular implementations necessarily include the use of particular hardware. It should also be understood that certain of these components 202-210 may include similar or common hardware. For example, two sets of circuitry may both leverage use of the same processor 202, memory 204, communications circuitry 208, or the like to perform their associated functions, such that duplicate hardware is not required for each set of circuitry. The use of the term "circuitry" as used herein includes particular hardware configured to perform the functions associated with respective circuitry described herein. As described in the example above, in some embodiments, various elements or components of the circuitry of the computing device 200 may be housed within one or more of the first user device 102 and/or the second user device 106. As indicated previously, it will be understood in this regard that some of the components described in connection with the computing device 200 may be housed within one of these devices, while other components are housed within another of these devices, or by yet another device not expressly illustrated in FIG. 1.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the computing device 200 may provide or supplement the functionality of particular circuitry.

In some embodiments, the processor 202 (and/or coprocessor or any other processing circuitry assisting or otherwise associated with the processor) may be in communication with the memory 204 via a bus for passing information among components of the computing device 200. The memory 204 may be non-transitory and may include, for example, one or more volatile and/or non-volatile memories. In other words, for example, the memory may be an electronic storage device (e.g., a non-transitory computer readable storage medium). The memory 204 may be configured to store information, data, content, applications, instructions, or the like, for enabling the computing device to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the computing device, and/or remote or "cloud" processors.

In an example embodiment, the processor 202 may be configured to execute instructions stored in the memory 204 or otherwise accessible to the processor 202. Alternatively or additionally, the processor 202 may be configured to execute hard-coded functionality. As such, whether configured by hardware or by a combination of hardware with software, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

The computing device 200 further includes input/output circuitry 206 that may, in turn, be in communication with processor 202 to provide output to a user and to receive input from a user, user device, or another source. In this regard, the input/output circuitry 206 may comprise a display that may be manipulated by a mobile application. In some embodiments, the input/output circuitry 206 may also include additional functionality such as a keyboard, a mouse, a joystick, a touch screen, touch areas, soft keys, a microphone, a speaker, or other input/output mechanisms. The processor 202 may be configured to control one or more functions of a display through computer program instructions (e.g., software and/or firmware) stored on a memory accessible to the processor (e.g., memory 204, and/or the like), so as receive user attribute data and/or sensor data.

The communications circuitry 208 may be any means such as a device or circuitry embodied in either hardware or a combination of hardware and software that is configured to receive and/or transmit data from/to a network and/or any other device, circuitry, or module in communication with the computing device 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s). These signals may be transmitted by the computing device 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

Object generation circuitry 210 includes hardware components designed to determine and/or generate candidate response data objects. For example, object generation circuitry 210 may include hardware components configured analyze user interaction data, operator success date, and/or the like as part of determining a format in which to present data entries to a particular user. As described hereafter, the object generation circuitry 210 may be configured to generate an operator notification comprising potential formats by which data entries may be presented to the first user and/or may be configured to convey the data entries in respective formats (e.g., first response format, second response format, etc.) to the user via respective communication channels. Object generation circuitry 210 may utilize processing circuitry, such as the processor 202, to perform its corresponding operations, and may utilize memory 204 to store collected information. It should also be appreciated that, in some embodiments, the object generation circuitry 210 may include a separate processor, specially configured field programmable gate array (FPGA), or application specific interface circuit (ASIC) to perform its corresponding functions.

In addition, computer program instructions and/or other type of code may be loaded onto a computer, processor or other programmable computing device's circuitry to produce a machine, such that the computer, processor other programmable circuitry that execute the code on the machine create the means for implementing the various functions, including those described in connection with the components of computing device 200.

As described above and as will be appreciated based on this disclosure, embodiments of the present disclosure may be configured as systems, methods, mobile devices, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example Operations for Multi-Channel Interactions

Figure 3:
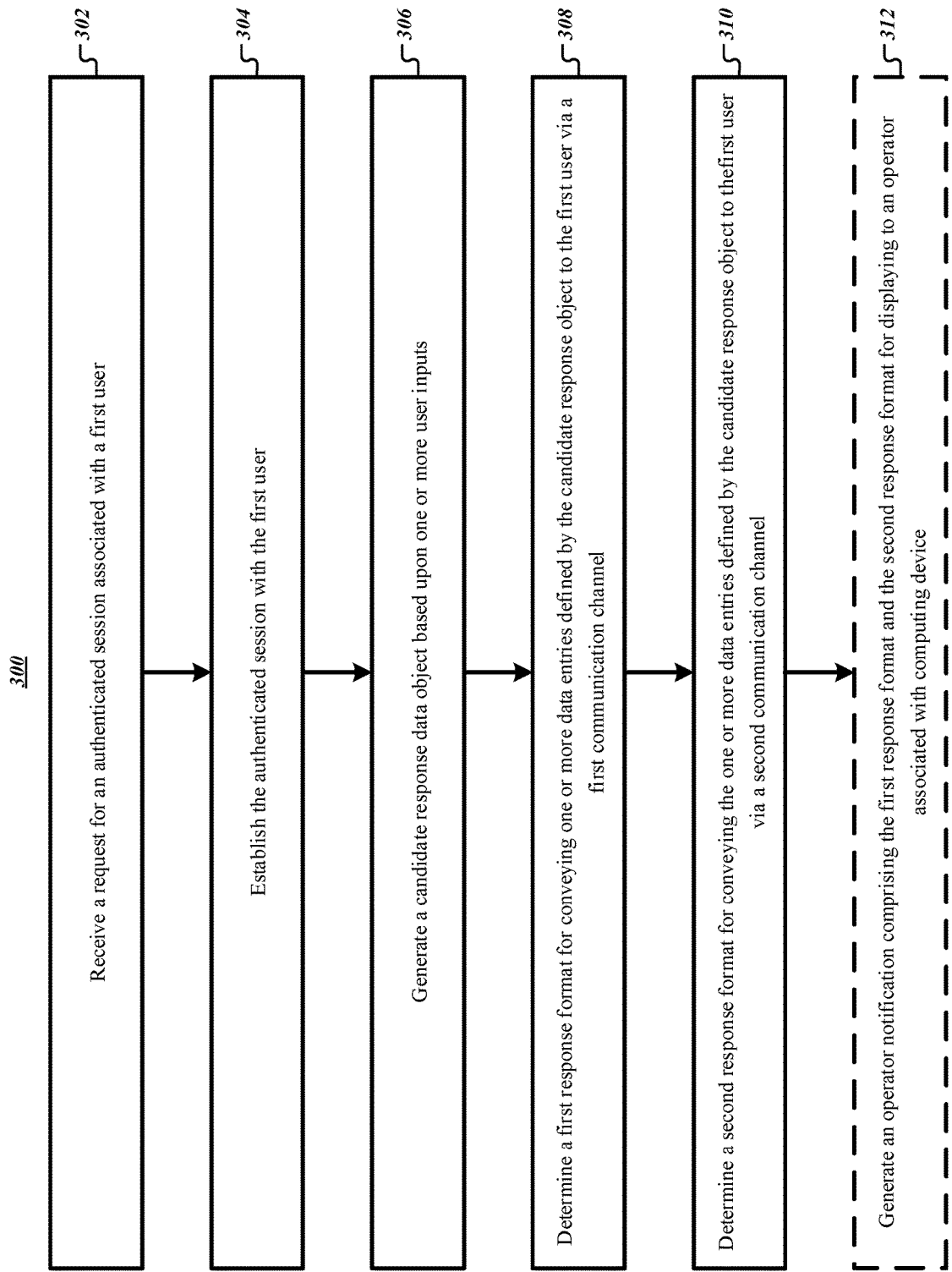
FIG. 3 illustrates an example flowchart for multi-channel interactions, in accordance with some example embodiments described herein.

FIG. 3 illustrates a flowchart containing a series of operations for multi-channel interactions. The operations illustrated in FIG. 3 may, for example, be performed by, with the assistance of, and/or under the control of an apparatus (e.g., computing device 200), as described above. In this regard, performance of the operations may invoke one or more of processor 202, memory 204, input/output circuitry 206, communications circuitry 208, and/or object generation circuitry 210.

As shown in operation 302, the apparatus (e.g., computing device 200) includes means, such as input/output circuitry 206, communications circuitry 208, or the like, for receiving, by the computing device 200, a request for an authenticated session associated with a first user. As described above, the computing device 200 of the present disclosure may be associated with, for example, a financial institution (e.g., a central server of a financial institution or otherwise) such that the request for an authenticated session may refer to a request by the first user, via the first user device 102, the second user device 106, etc. of the computing device 200 of the financial institution. In such an embodiment, the first user may transmit a request to the computing device at operation 302 via interactions with a application of the computing device (e.g., an account access portal, web-based application, etc.), via a call by the first user via the first user device 102 to a helpline associated with the computing device 200, and/or the like. Although described hereinafter with reference to a request by the first user for assistance with accessing an account of the first user with an entity associated with the computing device 200, the present disclosure contemplates that the request for the authenticated session by the first user at operation 302 may refer to any request by the first user associated with any feature, service, product, etc. offered by an entity associated with the computing device 200.

Additionally or alternatively, in some embodiments, the request received at operation 302 may refer to an action performed by the computing device 200 as opposed to an explicit request by the first user, via the first user device 102 or otherwise. By way of continued example, the first user may interact with one or more applications of the computing device 200 and unsuccessfully attempt to access an account associated with the first user. The computing device 200 may determine these unsuccessful attempts (e.g., unsuccessful log-in attempts by the first user or otherwise) and proactively establish the authenticated session with the first user at operation 302. In other words, the present disclosure contemplates that the request received at operation 302 may be an explicit request by the first user or an implicit request responsive to one or more actions by the first user.

Thereafter, as shown in operation 304, the apparatus (e.g., computing device 200) includes means, such as processor 202, communications circuitry 208, or the like, for establishing the authenticated session with the first user. The computing device 200 may leverage one or more mechanisms for confirming the identity (e.g., authenticating) the first user so as to establish the authenticated session at operation 304. By way of example, the first user, via the first user device 102 or otherwise, may be required to supply one or more passwords, usernames, account numbers, biometric inputs, etc. so as to confirm that the first user may access the information associated with the request received at operation 302. As described hereafter with reference to FIG. 4, the authenticated session may include establishing distinct communication channels (e.g., of the same user device or different user devices), such that establishing the authenticated session includes establishing a first communication channel with the first user and establishing a second communication channel with the first user. As such, the present disclosure contemplates that the authentication of the first user in establishing the authenticated session at operation 304 may leverage the mechanisms and/or functionality associated with the respective communication channel.

By way of example, the first communication channel may include a voice line or telephone call with an operator associated with the computing device. As such, the authentication of the first user with respect to the first communication channel may leverage a voice signature or recognition protocol to confirm the identity of the first user. By way of additional example, the second communication channel may include an interaction with the computing device 200 via a web-based or other application of the computing device 200 such that authenticating of the first user with regard to the second communication channel may refer to the input of a password or other account credentials by the first user via the application. In any embodiment, the present disclosure contemplates that the establishment of the authenticated session at operation 304 may be continuous or iterative in nature such that one or more inputs by the first user via the first communication channel and/or the second communication channel are iteratively used to continuously confirm the identity of the first user during the authenticated session. By way of continued example, the second communication channel may be established with either a first user device 102 or a second user device 106 of the first user that may include one or more sensors, cameras, etc. configured to capture images or other biometric data of the first user. In a continuous authentication embodiment, the sensors, cameras, etc. of the user device 102, 106 may operate to iteratively capture biometric data of the first user and continuously confirm the identity of the first user during the authentication session.

Thereafter, as shown in operation 306, the apparatus (e.g., computing device 200) includes means, such as processor 202, communications circuitry 208, object generation circuitry 210, or the like, for generating a candidate response data object based upon one or more user inputs received by the computing device 200. As described above, the first user may interact with the computing device 200 via the authenticated session to request assistance (e.g., information or the like) provided by an example operator associated with the computing device 200. By way of continued example, the first user may request assistance with accessing an example account of the first user associated with an entity of the computing device 200. As such, the one or more user inputs received by the computing device 200 may refer to inputs by the first user, via one or more user devices 102, 106 requesting assistance with this access. For example, the one or more user inputs may refer to a voiced request for assistance via a telephonic conversation with an operator via a first communication channel established with the first user device 102 of the first user. Additionally or alternatively, the one or more user inputs may refer to an inputted request (e.g., typed or the like) by the first user via an application (e.g., web-based or otherwise) via a second communication channel established with the first user device 102 or the second user device 106 of the first user.

Figure 5:
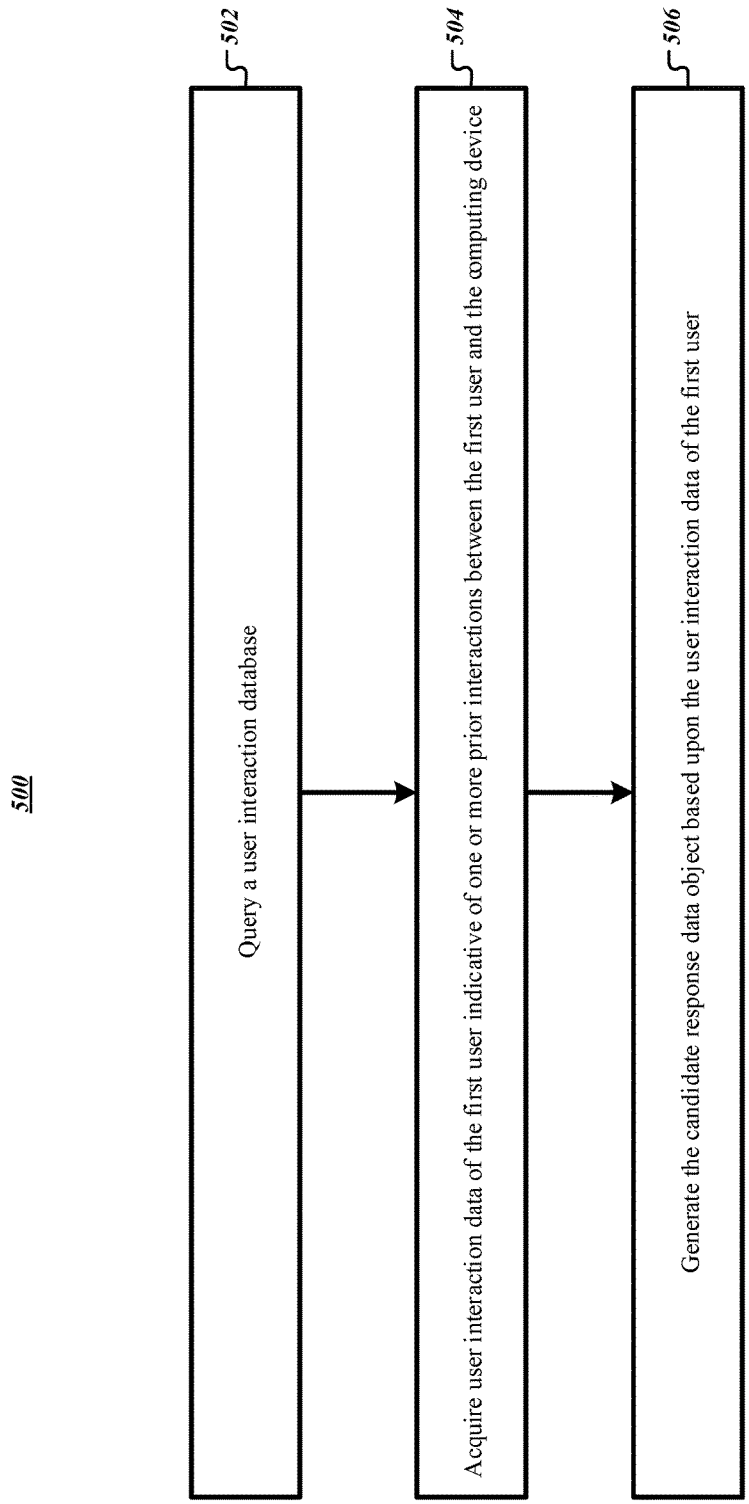
FIG. 5 illustrates an example flowchart for user interaction database operations, in accordance with some example embodiments described herein.
Figure 6:
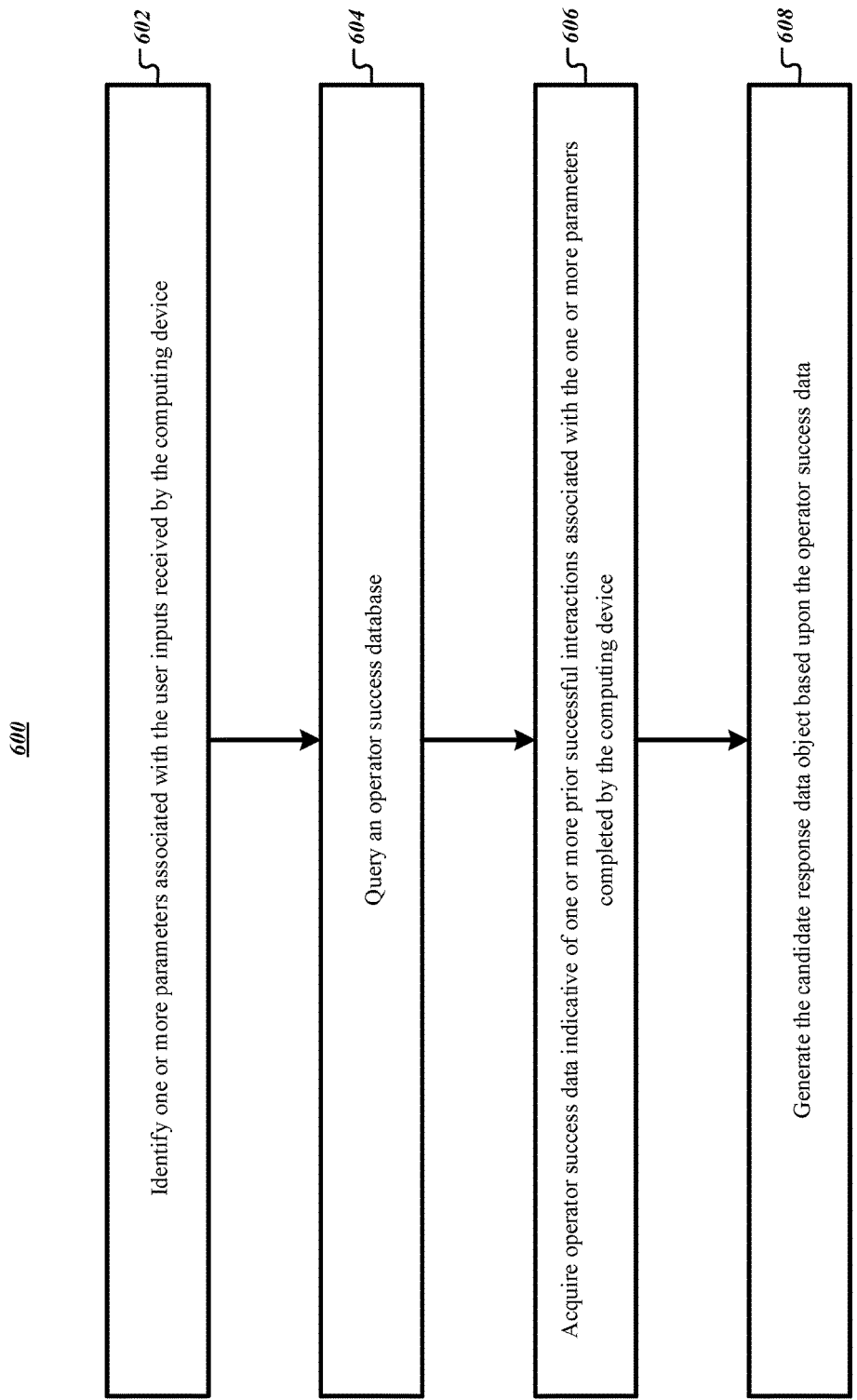
FIG. 6 illustrates an example flowchart for operator success database operations, in accordance with some example embodiments described herein.

As described hereafter with reference to FIGS. 5-6, the computing device 200 may leverage the results of prior interactions, by the first user and/or other users, with the computing device 200 to improve the current interaction with the first user, particularly in the multi-channel embodiments described herein. For example, the computing device may query a user interaction database 108 storing data entries associated with or indicative of one or more prior interactions between the first user and the computing device 200. As described above, the computing device of the present disclosure may be associated with an entity (e.g., a financial institution or otherwise) with which the first user interacts (e.g., due to an account of the first user with the entity or the like). As such, the first user may interact with the computing device 200 at various times, such as requesting the assistance of an operator associated with the computing device 200 (e.g., an employee of the financial instruction or otherwise) with regard to an example account of the first user. During each interaction, the operator (e.g., the same or distinct operators for each interaction) may provide information, responses, etc. to the first user in an attempt to satisfy the first user's request. The information provided to the first user, the outcome of the interaction, the wording/ tone used by the operator, and/or any metric associated with the interaction may be stored by the user interaction database 108 for further improving subsequent interactions with the first user. As such, the generation of the candidate response data object may be based at least in part upon the user interaction data generated in prior interactions by the first user with the computing device 200. For example, the user interaction data may be indicative of a successful result with the first user with using a conversational tone, a particular selection of words, a particular visual display, and/or the like.

Additionally or alternatively, the computing device 200 may leverage the collective interactions of a plurality of users with the computing device 200 in generating the candidate response data object at operation 306. As described above and hereafter with reference to FIG. 6, the computing device 200 may query an operator success database 110 that stores data entries associated with or indicative of one or more prior interactions between a plurality of users and the computing device 200. The computing device 200 of the present disclosure may be associated with an entity (e.g., a financial institution or otherwise) with which a plurality of users interact (e.g., due to respective accounts of the users with the entity or the like). As such, these users may interact with the computing device 200 at various times, such as requesting the assistance of an operator associated with the computing device (e.g., an employee of the financial instruction or otherwise) with regard to an example account of the user(s). During each interaction, the operator (e.g., the same or distinct operators for each interaction) may similarly provide information, responses, etc. to the respective user in an attempt to satisfy the user's request.

Each interaction (e.g., a request by a user) with the computing device 200 may further be associated with one or more parameters that define the characteristics, type, etc. of the request. By way of continued example, the one or more parameters may be indicative of the amount defined by a transaction, the time period during which the associated user has had an account with the entity, the nature of the request (e.g., user account access, financial transaction success, employee complaints, etc.), and/or any parameters associated with any potential request of the entity. As such, the operator success database 110 may group interactions, the data provided during these grouped interactions, the success of each interaction within each group, etc. for further improving subsequent interactions with the computing device/operator associated with similar parameters. Furthermore, each interaction may be associated with a success rating or score indicative of the computing device's 200 confidence that use of a similar format, wording, process, configuration, etc. may lead to a similarly successful result. In some embodiments, the prior interactions stored by the operator success database 110 may be further associated with particular operators so as to allow for an increased influence by operators that are more successful in interacting with users than other operators. As such, the generation of the candidate response data object may be based at least in part upon the operator success data generated in prior interactions with the computing device 200 by a plurality of users. For example, the operator success data may be indicative of a successful result with other users who also requested assistance with account access (e.g., a common parameter associated with the user input) with using a conversational tone, a particular selection of words, a particular visual display, and/or the like.

Thereafter, as shown in operations 308 and 310, the apparatus (e.g., computing device 200) includes means, such as processor 202, communications circuitry 208, object generation circuitry 210, or the like, for determining a first response format for conveying one or more data entries defined by the candidate response data object to the first user via the first communication channel and for determining a second response format for conveying the one or more data entries defined by the candidate response data object to the first user via the second communication channel. As described above and hereafter with reference to FIG. 4, the embodiments of the present disclosure may provide for data or information to be provided to the first user via differing communication channels. As would be evident based upon the different features, technology, etc. associated with the distinct communication channels and devices, some communication channels may be better suited for providing certain types of information to the first user. By way of continued example, in an instance in which the first communication channel refers to a telephone call between the operator and the first user and the second communication channel refers to a displayed application of the first user's device, the first response format for the first communication channel may refer to a particular selection of words and/or tone to be spoken by the operator. The second response format for the second communication channel may refer to a different particular selection of words, images, sounds, etc. to be provided to the first user, such as via a display of the first user device 102 and/or the second user device 106.

Thereafter, in some embodiments as shown in operation 312, the apparatus (e.g., computing device 200) includes means, such as processor 202, communications circuitry 208, object generation circuitry 210, or the like, for generating an operator notification comprising the first response format and the second response format for displaying to an operator associated with the computing device 200. By way of example, the request received at operation 302 may be assigned to a particular operator associated with the computing device 200, such that the particular operator is responsible for providing the information requested by the first user or otherwise assisting with the first user's request. In such an embodiment, prior to providing the data entries associated with the information requested by the first user, the computing device 200 may generate an operator notification that includes the suggested format with which to convey the data entries. For example, the computing device 200 may be associated with a display that is viewed by the operator such that the operator notification causes a rendering of the data entries and associated response formats for consideration by the operator. In doing so, the embodiments of FIG. 3 may allow the operator to tailor the particular type and format of information provided to the first user to increase the success of the first user's interaction with the entity associated with the computing device 200.

Figure 4:
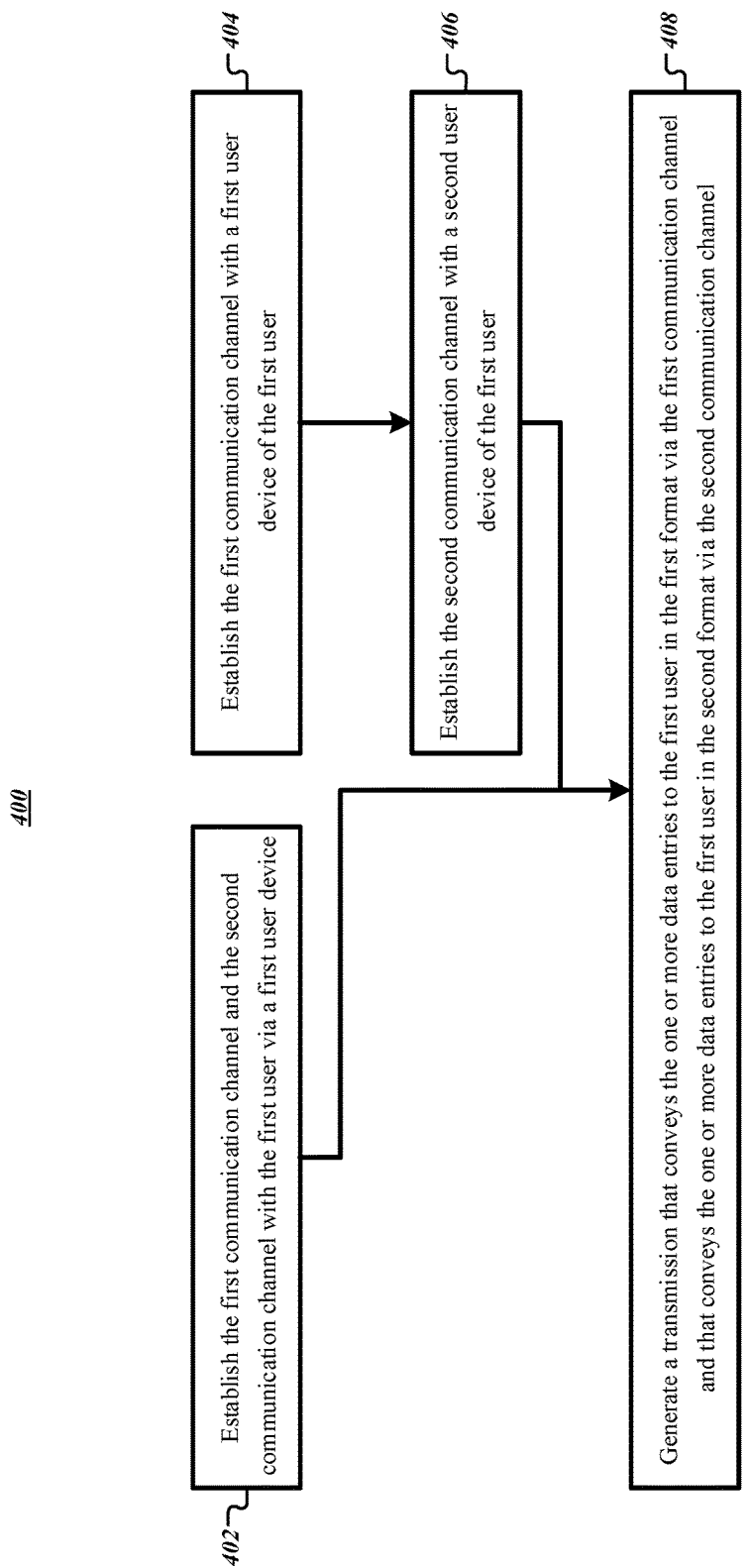
FIG. 4 illustrates an example flowchart for multi-device implementations, in accordance with some example embodiments described herein.

FIG. 4 illustrates a flowchart containing a series of operations for multi-device implementations. The operations illustrated in FIG. 4 may, for example, be performed by, with the assistance of, and/or under the control of an apparatus (e.g., computing device 200), as described above. In this regard, performance of the operations may invoke one or more of processor 202, memory 204, input/output circuitry 206, communications circuitry 208, and/or object generation circuitry 210.

As shown in operation 402, the apparatus (e.g., computing device 200) includes means, such as input/output circuitry 206, communications circuitry 208, or the like, for establishing the first communication channel and the second communication channel with the first user device 102 of the first user. Said differently, in some embodiments, the multi-channel interactions described herein may occur on the same user device (e.g., first user device 102). By way of example, the first user may interact with the computing device 200 via the first user device by calling a helpline of the entity associated with the computing device (e.g., the first communication channel) while simultaneously viewing an application rendered by a display of the first user device (e.g., a second communication channel). As detailed above, particular information or data entries may be more easily conveyed by a particular communication medium (e.g., such as a visual medium compared to an auditory medium). As would be evident in light of the nature of these multi-channel interactions, the first communication channel and the second communication channel may be synced or otherwise operate in tandem in order to ensure that the associated user is effectively and accurately conveyed information (e.g., regardless of format). Said differently, the multi-channel interactions provide clarity of communication not found in traditional systems.

As such, the computing device 200 may leverage the operations of FIG. 3 above and FIGS. 5-6 hereafter to select a particular response format for conveying the particular information or data entries to the first user. As such and as shown thereafter in operation 408, the apparatus (e.g., computing device 200) includes means, such as input/output circuitry 206, communications circuitry 208, or the like, for generating a transmission to the first user device 102 that conveys the one or more data entries to the first user in the first response format via the first communication channel of the first user device 102 and that conveys the one or more data entries to the first user in the second response format via the second communication channel of the first user device 102. By way of continued example, the transmission generated at operation 408 may cause particular data entries to be rendered via a display of the first user device 102 while the same transmission either prompts an operator to or causes a speaker of the first user device 102 to convey other particular data entries via an auditory transmission.

In other embodiments, as shown in operations 404-406, the apparatus (e.g., computing device 200) includes means, such as input/output circuitry 206, communications circuitry 208, or the like, for establishing the first communication channel with the first user device 102 of the first user and establishing the second communication channel with the second user device 106 of the first user. By way of example, the first user may call a helpline of an entity associated with the computing device 200 as defined above but may access an application of the computing device 200 via a separate tablet, laptop, or other user device (e.g., second user device 106). In such an embodiment, the first and/or second response format generated by the operations of FIG. 3 may, for example, remain unchanged such that the generation of the transmission at operation 408 requires only distinct transmissions to distinct user devices 102, 106. Said differently and as shown in operation 408, the apparatus (e.g., computing device 200) includes means, such as input/output circuitry 206, communications circuitry 208, or the like, for generating a transmission to the first user device 102 that conveys the one or more data entries to the first user in the first response format via the first communication channel and generating a transmission to the second user device 106 that conveys the one or more data entries to the first user in the second response format via the second communication channel.

Although described herein with reference to similar response formats for the same device implementation and the multi-device implementation, the present disclosure contemplates that the functionality provided by a particular device (e.g., the second user device 106) may influence or impact the example second response format used to convey the one or more data entries to the first user via the second communication channel. By way of continued example, a first communication channel that refers to a telephonic communication with an operator may be unable to properly convey the first user's spending habits, budgets, etc. in visual format for consumption by the first user. A second communication channel that refers to a viewed application of the first user's laptop, for example, however, may convey the same data (e.g., the one or more data entries) for properly viewing by the first user. The present disclosure contemplates that the computing device 200 may determine any response format based upon the functionality of the associated user devices, the prior successes with a particular user, and/or the prior successes with a plurality of users without limitation.

FIG. 5 illustrates a flowchart containing a series of operations for user interaction database implementations. The operations illustrated in FIG. 5 may, for example, be performed by, with the assistance of, and/or under the control of an apparatus (e.g., computing device 200), as described above. In this regard, performance of the operations may invoke one or more of processor 202, memory 204, input/output circuitry 206, communications circuitry 208, and/or object generation circuitry 210.

As shown in operation 502, the apparatus (e.g., computing device 200) includes means, such as input/output circuitry 206, communications circuitry 208, or the like, for querying a user interaction database 108. As described above, the computing device 200 may leverage the results of prior interactions by the first user with the computing device 200 to improve the current interaction with the first user, particularly in the multi-channel embodiments described herein. For example, the computing device may query a user interaction database 108 storing data entries associated with or indicative of one or more prior interactions between the first user and the computing device 200. As described above, the computing device of the present disclosure may be associated with an entity (e.g., a financial institution or otherwise) with which the first user interacts (e.g., due to an account of the first user with the entity or the like). As such, the first user may interact with the computing device 200 at various times, such as requesting the assistance of an operator associated with the computing device 200 (e.g., an employee of the financial instruction or otherwise) with regard to an example account of the first user.

During each interaction, user interaction data may be generated that is tied to the first user and the associated success with the first user with regard to a particular prior interaction. By way of example, the first user may request assistance with accessing an account of the user at one or more times prior to the current request. During these interactions, an operator handling the interaction may note the success of a particular visual representation that demonstrates how to access the user's account. Data entries indicative of such a particular visual representation may be stored as user interaction data for use in further interactions with the first user. As such, as shown in operation 504, the apparatus (e.g., computing device 200) includes means, such as input/output circuitry 206, communication circuitry 208, or the like, for acquiring user interaction data of the first user indicative of one or more prior interactions between the first user and the computing device 200, such as indicative of the prior success of the aforementioned particular visual representation.

Thereafter, as shown in operation 506, the apparatus (e.g., computing device 200) includes means, such as input/output circuitry 206, object generation circuitry 210, or the like, for generating the candidate response data object based upon the user interaction data of the first user. By way of continued example, the first user may request assistance, as described above with reference to the operations of FIG. 3, with accessing an account of the first user as a subsequent time (e.g., a time other than the prior interactions with the computing device 200). In acquiring user interaction data at operation 504, the computing device 200 and/or an operator associated with the computing device 200 may acquire user interaction data indicative of the prior success of a particular visual representation in assisting the first user. As such, the computing device may generate the candidate response data object based at least in part on this user interaction data so that the particular visual representation is either provided to the operator for use or directly conveyed to the first user via the appropriate communication channel(s). Although described herein with reference to a particular visual representation for the first user, the present disclosure contemplates that the user interaction data may be indicative of any particular wording, images, tone, language, color, shape, sound, configuration etc. without limitation that may increase the likelihood of a successful interaction with the first user.

FIG. 6 illustrates a flowchart containing a series of operator success database implementations. The operations illustrated in FIG. 6 may, for example, be performed by, with the assistance of, and/or under the control of an apparatus (e.g., computing device 200), as described above. In this regard, performance of the operations may invoke one or more of processor 202, memory 204, input/output circuitry 206, communications circuitry 208, and/or object generation circuitry 210.

As shown in operation 602, the apparatus (e.g., computing device 200) includes means, such as input/output circuitry 206, communications circuitry 208, or the like, for identifying one or more parameters associated with the user inputs received by the computing device 200. As described above, each interaction (e.g., a request by a user) with the computing device 200 may further be associated with one or more parameters that define the characteristics, type, etc. of the request. By way of continued example, the one or more parameters may be indicative of the amount defined by a transaction, the time period during which the associated user has had an account with the entity, the nature of the request (e.g., user account access, financial transaction success, employee complaints, etc.), and/or the like. In other words, the one or more parameters identified at operation 602 may refer to any way by which interactions with the computing device 200 may be grouped.

As shown in operation 604, the apparatus (e.g., computing device 200) includes means, such as input/output circuitry 206, communications circuitry 208, or the like, for querying an operator success database 110. As described above, the computing device 200 may leverage the collective interactions of a plurality of users with the computing device 200 in generating the candidate response data object at operation 306 in FIG. 3. The computing device 200 may query an operator success database 110 that stores data entries associated with or indicative of one or more prior interactions between a plurality of users and the computing device 200. In some embodiments, the prior interactions stored by the operator success database 110 may be further associated with particular operators so as to allow for an increased influence by operators that are more successful in interacting with users than other operators. As such, the generation of the candidate response data object may be based at least in part upon the operator success data generated in prior interactions with the computing device 200 by a plurality of users. For example, the operator success data may be indicative of a successful result with other users who also requested assistance with account access (e.g., a common parameter associated with the user input) with using a particular visual representation in assisting other users. As such, as shown in operation 606, the apparatus (e.g., computing device 200) includes means, such as input/output circuitry 206, communication circuitry 208, or the like, for acquiring operator success data indicative of one or more prior successful interactions associated with the one or more parameters completed by the computing device 200, such as operator success data indicative of the prior success of the aforementioned visual representation.

Thereafter, as shown in operation 608, the apparatus (e.g., computing device 200) includes means, such as input/output circuitry 206, object generation circuitry 210, or the like, for generating the candidate response data object based upon the operator success data. By way of continued example, the first user may request assistance, as described above with reference to the operations of FIG. 3, with accessing an account of the first user as a subsequent time (e.g., a time other than the prior interactions with the computing device 200). In acquiring operator success data at operation 606, the computing device 200 and/or an operator associated with the computing device 200 may acquire operator success data indicative of the prior success of a particular visual representation in assisting one or more other users with similar requests (e.g., as defined by the one or more parameters identified at operation 602). As such, the computing device 200 may generate the candidate response data object based at least in part on this operator success data so that the particular visual representation is either provided to the operator for use or directly conveyed to the first user via the appropriate communication channel(s). Although described herein with reference to a particular visual representation for the first user, the present disclosure contemplates that the operator success data may be indicative of any particular wording, images, tone, language, color, shape, sound, configuration etc. without limitation that may increase the likelihood of a successful interaction with the first user based upon prior interactions with other users.

As described above, various technical challenges are surmounted via technical solutions contemplated herein. For example, example implementations of embodiments of the present disclosure generate candidate response data objects that account for the nuances associated with a particular user, as gathered from prior interactions with the particular user, and further leverage the successful response strategies employed by successful operators, as gathered from prior interactions by these successful operators. In operation, the embodiments described herein access user interaction databases that include data entries associated with successful interactions with a particular user as well as operator success databases that include data entries associated with successful responses by operators associated with particular user requests, issues, etc. Furthermore, the embodiments described herein may selectively format data entries based upon the particular channels by which the data may be provided to the user. For example, the format of data that is convey to a user via a communication channel that may be viewed (e.g., a display of a user device) may provide additional detail that may be difficult to provide via a communication channel that is heard (e.g., a telephone communication with an operator). In this way, the inventors have identified that the advent of computing resources have created a new opportunity for solutions for device interaction and multi-channel communication which were historically unavailable.

FIGS. 3-6 thus illustrate flowcharts describing the operation of apparatuses, methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 204 of the computing device 200 and executed by a processor 202 of the computing device 200. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

CONCLUSION

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A computer-implemented method comprising:
    receiving, by a computing device, a request for an authenticated session associated with a first user, wherein the request is associated with an unsuccessful login attempt;
    proactively establishing, in response to the unsuccessful login attempt, the authenticated session with the first user, wherein establishing the authenticated session comprises:
        establishing a first communication channel with the first user; and
        establishing a second communication channel with the first user;
    generating a candidate response data object based upon one or more user inputs received by the computing device via the first communication channel and/or the second communication channel;
    determining a first response format for conveying one or more data entries defined by the candidate response data object to the first user via the first communication channel;
    determining a second response format for conveying the one or more data entries defined by the candidate response data object to the first user via the second communication channel; and
    causing transmission of the one or more data entries to the first user using the first response format via the first communication channel and the second response format via the second communication channel.

2. The computer-implemented method according to claim 1, further comprising generating an operator notification comprising the first response format and the second response format for displaying to an operator associated with the computing device.

3. The computer-implemented method according to claim 1, wherein the first communication channel and the second communication channel are each established with a first user device of the first user.

4. The computer-implemented method according to claim 3, wherein causing transmission of the one or more data entries to the first user comprises causing transmission of the one or more data entries to the first user in the first response format via the first communication channel of the first user device and causing transmission of the one or more data entries to the first user in the second response format via the second communication channel of the first user device.

5. The computer-implemented method according to claim 1, wherein:
    the first communication channel is established with a first user device of the first user; and
    the second communication channel is established with a second user device of the first user.

6. The computer-implemented method according to claim 5, further comprising:
    generating a transmission to the first user device that conveys the one or more data entries to the first user in the first response format via the first communication channel; and
    generating a transmission to the second user device that conveys the one or more data entries to the first user in the second response format via the second communication channel.

7. The computer-implemented method according to claim 1, wherein generating the candidate response data object further comprises:
  querying a user interaction database;
  acquiring user interaction data of the first user indicative of one or more prior interactions between the first user and the computing device; and
  generating the candidate response data object based upon the user interaction data of the first user.

8. The computer-implemented method according to claim 1, wherein generating the candidate response data object further comprises:
  identifying one or more parameters associated with the one or more user inputs received by the computing device;
  querying an operator success database;
  acquiring operator success data indicative of one or more prior successful interactions between an operator and the first user, wherein each of the one or more prior successful interactions is associated with (i) the one or more parameters completed by the computing device, (ii) a success score that satisfies a confidence level, and (iii) at least one of the first response format and the second response format; and
  generating the candidate response data object based upon the one or more prior successful interactions.

9. The computer-implemented method according to claim 1, further comprising continuously authenticating the first user via one or more inputs iteratively received by the computing device via the first communication channel and/or the second communication channel.

10. An apparatus comprising at least one processor and at least one memory, the at least one memory having computer-code instructions stored thereon that, in execution with the at least one processor, configure the apparatus to:
  receive a request for an authenticated session associated with a first user, wherein the request is associated with an unsuccessful login attempt;
  proactively establish, in response to the unsuccessful login attempt, the authenticated session with the first user, wherein establishing the authenticated session comprises:
    establishing a first communication channel with the first user; and
    establishing a second communication channel with the first user;
  generate a candidate response data object based upon one or more user inputs received by the apparatus via the first communication channel and/or the second communication channel;
  determine a first response format for conveying one or more data entries defined by the candidate response data object to the first user via the first communication channel;
  determine a second response format for conveying the one or more data entries defined by the candidate response data object to the first user via the second communication channel; and
  cause transmission of the one or more data entries to the first user using the first response format via the first communication channel and the second response format via the second communication channel.

11. The computer-implemented method according to claim 1, wherein the request for the authenticated session is received from the first user.

12. The apparatus according to claim 10, wherein the first communication channel and the second communication channel are each established with a first user device of the first user.

13. The apparatus according to claim 12, further configured to a cause transmission of the one or more data entries to the first user by causing transmission of the one or more data entries to the first user in the first response format via the first communication channel of the first user device and causing transmission of the one or more data entries to the first user in the second response format via the second communication channel of the first user device.

14. The apparatus according to claim 10, wherein:
  the first communication channel is established with a first user device of the first user; and
  the second communication channel is established with a second user device of the first user.

15. The apparatus according to claim 14, further configured to:
  generate a transmission to the first user device that conveys the one or more data entries to the first user in the first response format via the first communication channel; and
  generate a transmission to the second user device that conveys the one or more data entries to the first user in the second response format via the second communication channel.

16. The apparatus according to claim 10, wherein, in generating the candidate response data object, is further configured to:
  query a user interaction database;
  acquire user interaction data of the first user indicative of one or more prior interactions between the first user and the apparatus; and
  generate the candidate response data object based upon the user interaction data of the first user.

17. The apparatus according to claim 10, wherein, in generating the candidate response data object, is further configured to:
  identify one or more parameters associated with the one or more user inputs received by the apparatus;
  query an operator success database;
  acquire operator success data indicative of one or more prior successful interactions between an operator and the first user, wherein each of the one or more prior successful interactions is associated with (i) the one or more parameters completed by the apparatus, (ii) a success score that satisfies a confidence level, and (iii) at least one of the first response format and the second response format; and
  generate the candidate response data object based upon the one or more prior successful interactions.

18. The apparatus according to claim 10, further configured to continuously authenticate the first user via one or more inputs iteratively received by the apparatus via the first communication channel and/or the second communication channel.

19. A computer program product comprising at least one non-transitory computer-readable storage medium having computer program code thereon that, in execution with at least one processor, configures the computer program product for:
  receiving a request for an authenticated session associated with a first user, wherein the request is associated with an unsuccessful login attempt;

proactively establishing, in response to the unsuccessful login attempt, the authenticated session with the first user, wherein establishing the authenticated session comprises:
  establishing a first communication channel with the first user; and
  establishing a second communication channel with the first user;
generating a candidate response data object based upon one or more user inputs received via the first communication channel and/or the second communication channel;
determining a first response format for conveying one or more data entries defined by the candidate response data object to the first user via the first communication channel;
determining a second response format for conveying the one or more data entries defined by the candidate response data object to the first user via the second communication channel; and
causing transmission of the one or more data entries to the first user using the first response format via the first communication channel and the second response format via the second communication channel.

20. The computer program product according to claim 19, further configured for generating an operator notification comprising the first response format and the second response format for displaying to an operator.

\* \* \* \* \*